US012116842B2

(12) United States Patent
Swier

(10) Patent No.: US 12,116,842 B2
(45) Date of Patent: Oct. 15, 2024

(54) AUXILIARY STEP PLATFORM FOR LADDER

(71) Applicant: Casey Swier, Glendale, AZ (US)

(72) Inventor: Casey Swier, Glendale, AZ (US)

(73) Assignee: David Boothe, Branson, MO (US)

( * ) Notice: Subject to any disclaimer, the term of this patent is extended or adjusted under 35 U.S.C. 154(b) by 184 days.

(21) Appl. No.: 17/324,465

(22) Filed: May 19, 2021

(65) Prior Publication Data

US 2021/0363823 A1 Nov. 25, 2021

Related U.S. Application Data

(60) Provisional application No. 63/027,027, filed on May 19, 2020.

(51) Int. Cl.
*E06C 7/16* (2006.01)

(52) U.S. Cl.
CPC .................................... *E06C 7/165* (2013.01)

(58) Field of Classification Search
CPC ................................. E06C 7/165; E06C 7/081
See application file for complete search history.

(56) References Cited

U.S. PATENT DOCUMENTS

| | | | |
|---|---|---|---|
| 184,013 | A | 11/1876 | Krickl |
| 363,695 | A | 5/1887 | Sperry |
| 1,622,739 | A | 3/1927 | Rosenblum et al. |
| 1,757,992 | A | 5/1930 | Edwin et al. |
| 1,767,782 | A | 6/1930 | Awbrey |
| 2,044,407 | A | 6/1936 | Smith |
| 2,158,044 | A | 5/1939 | Haller |
| D124,173 | S | 12/1940 | Galtieri |
| 2,484,947 | A | 10/1949 | Hovan |
| 3,801,424 | A | 4/1974 | Robbins |

(Continued)

FOREIGN PATENT DOCUMENTS

| | | | | |
|---|---|---|---|---|
| DE | 20214212 | * | 9/2003 | E06C 7/165 |
| DE | 202019004166 | * | 2/2020 | E06C 7/081 |
| FR | 2688024 A1 | * | 9/1993 | E06C 7/165 |

OTHER PUBLICATIONS

Machine Translation FR-2688024 (Year: 1993).*
Machine Translation DE202019004166 (Year: 2020).*
Stepdek, 2023, https://stepdek.com/products/stepdek.

*Primary Examiner* — Brian D Mattei
*Assistant Examiner* — Jacob G Sweeney
(74) *Attorney, Agent, or Firm* — Schmeiser, Olsen & Watts LLP

(57) ABSTRACT

An auxiliary platform for a ladder step. The auxiliary platform may include a substantially rectangular and horizontally oriented platform with a platform front negative edge and a platform rear edge hem. The auxiliary platform may further include a substantially flat front surface with a front surface flanged rearward-extending edge, the front surface flanged from the platform front negative edge. Additionally, the auxiliary platform a bracing surface flanged from and extended downward from the platform rear edge hem and oriented substantially parallel to the front surface, and a biasing member removably connected to the bracing surface. When the platform is placed on the ladder step and the biasing member biased against the ladder step and the bracing surface to secure the auxiliary platform to the ladder step.

4 Claims, 7 Drawing Sheets

(56) References Cited

U.S. PATENT DOCUMENTS

| | | | |
|---|---|---|---|
| D256,618 S | 8/1980 | Klein | |
| D258,839 S | 4/1981 | Broyles | |
| 4,318,951 A | 3/1982 | Naka et al. | |
| 4,321,293 A | 3/1982 | Naka | |
| D272,430 S | 1/1984 | Minichillo et al. | |
| D279,607 S | 7/1985 | Rutter | |
| D291,006 S | 7/1987 | Minichillo et al. | |
| D324,668 S | 3/1992 | Anderson | |
| 5,103,608 A | 4/1992 | Andreo | |
| D341,431 S | 11/1993 | Kniefel et al. | |
| D349,678 S | 8/1994 | Waddington et al. | |
| D349,679 S | 8/1994 | Waddington et al. | |
| 5,386,673 A | 2/1995 | Bellegarde | |
| D389,588 S | 1/1998 | Dunk | |
| D415,289 S | 10/1999 | Dalton | |
| D415,575 S | 10/1999 | Nickel | |
| 6,076,936 A | 6/2000 | George | |
| 6,173,540 B1 | 1/2001 | Spivey | |
| 6,318,499 B1 | 11/2001 | Honein et al. | |
| D462,453 S | 9/2002 | Johansson | |
| 6,546,680 B1 | 4/2003 | Watts | |
| 6,786,300 B1 * | 9/2004 | Bonifacini | E06C 7/165 182/120 |
| D500,860 S | 1/2005 | Westby et al. | |
| D500,861 S | 1/2005 | Westby et al. | |
| D500,862 S | 1/2005 | Westby et al. | |
| D519,430 S | 4/2006 | Moody | |
| D519,648 S | 4/2006 | Enersen | |
| 7,082,725 B2 | 8/2006 | Visser | |
| D567,729 S | 4/2008 | Crandall | |
| D573,723 S | 7/2008 | Vibiano | |
| D593,785 S | 6/2009 | Preda | |
| D595,079 S | 6/2009 | Preda | |
| D595,630 S | 7/2009 | McPherson et al. | |
| D654,295 S | 2/2012 | Preda | |
| D655,554 S | 3/2012 | Preda | |
| D661,816 S | 6/2012 | Young | |
| D682,446 S | 5/2013 | Young | |
| D683,479 S | 5/2013 | Göransson et al. | |
| D685,503 S | 7/2013 | Gardner | |
| 8,857,115 B2 | 10/2014 | Epple | |
| D717,969 S | 11/2014 | Green | |
| D718,875 S | 12/2014 | Moreno et al. | |
| D731,675 S | 6/2015 | Karau | |
| D732,191 S | 6/2015 | Price et al. | |
| D732,192 S | 6/2015 | Price et al. | |
| D732,193 S | 6/2015 | Price et al. | |
| D732,195 S | 6/2015 | Price et al. | |
| D732,196 S | 6/2015 | Price et al. | |
| D732,197 S | 6/2015 | Price et al. | |
| D732,198 S | 6/2015 | Price et al. | |
| D733,326 S | 6/2015 | Gribble et al. | |
| D733,933 S | 7/2015 | Lee et al. | |
| D766,796 S | 9/2016 | Huffman et al. | |
| D768,043 S | 10/2016 | Hartman | |
| D784,048 S | 4/2017 | Ellingson | |
| D801,547 S | 10/2017 | Lopez | |
| D804,058 S | 11/2017 | Mickelson et al. | |
| D811,620 S | 2/2018 | Bernhardsson et al. | |
| D826,429 S | 8/2018 | Champ et al. | |
| D875,014 S | 2/2020 | Chen | |
| 10,570,629 B1 | 2/2020 | Chen | |
| D915,624 S | 4/2021 | Allen | |
| D915,625 S | 4/2021 | Allen | |
| D916,324 S | 4/2021 | Pindado | |
| D917,725 S | 4/2021 | McWilliams | |
| D921,927 S | 6/2021 | Fuller et al. | |
| D923,202 S | 6/2021 | Estes | |
| D936,241 S | 11/2021 | Rus | |
| D940,351 S | 1/2022 | Bilge | |
| D940,352 S | 1/2022 | Bilge | |
| 11,293,193 B2 | 4/2022 | Rus | |
| D952,190 S | 5/2022 | Rus | |
| D953,579 S | 5/2022 | Young | |
| D957,694 S | 7/2022 | Polston | |
| D961,117 S | 8/2022 | Young | |
| D963,199 S | 9/2022 | Nedza | |
| D963,892 S | 9/2022 | Greer et al. | |
| D997,386 S | 8/2023 | Bremer et al. | |
| 2002/0066242 A1 | 6/2002 | Hsu | |
| 2003/0182880 A1 | 10/2003 | Weaber et al. | |
| 2004/0139666 A1 | 7/2004 | Kraft | |
| 2004/0206038 A1 | 10/2004 | Stanchfield | |
| 2005/0181164 A1 | 8/2005 | Piumarta et al. | |
| 2006/0150540 A1 | 7/2006 | Kennedy | |
| 2006/0196129 A1 | 9/2006 | Lin | |
| 2006/0230693 A1 | 10/2006 | Giordano | |
| 2007/0028534 A1 | 2/2007 | Defehr et al. | |
| 2008/0028699 A1 | 2/2008 | Mak | |
| 2008/0271390 A1 | 11/2008 | Lopez | |
| 2009/0145059 A1 | 6/2009 | Kay | |
| 2009/0235594 A1 | 9/2009 | Won | |
| 2009/0277104 A1 | 11/2009 | McCool | |
| 2010/0281796 A1 | 11/2010 | Kennedy | |
| 2010/0287870 A1 | 11/2010 | Sondermann | |
| 2011/0162302 A1 | 7/2011 | Barrett | |
| 2011/0179729 A1 | 7/2011 | Thompson | |
| 2012/0204502 A1 | 8/2012 | Gardner | |
| 2012/0297705 A1 | 11/2012 | Kay | |
| 2013/0055666 A1 | 3/2013 | Lopez | |
| 2013/0255168 A1 | 10/2013 | Keller et al. | |
| 2013/0305635 A1 | 11/2013 | McCool et al. | |
| 2018/0347216 A1 | 12/2018 | Rus | |

* cited by examiner

AUXILIARY STEP PLATFORM FOR LADDER

CROSS REFERENCE TO RELATED APPLICATION[S]

This application claims priority to U.S. Provisional Patent Application Ser. No. 63/027,027, filed May 19, 2020, the disclosure of which is hereby incorporated entirely herein by reference.

BACKGROUND OF THE INVENTION

Technical Field

This invention relates generally to tools and particularly to ladders and accessories therefor.

State of the Art

The use of ladders is common within homes, construction sites and so forth. In particular, ladders are used to reach heights while performing work, such as painting, home maintenance and the like. However, ladders have drawbacks. The steps of ladders are necessarily skinny in order to limit the storage size of the ladder. This becomes an issue for an individual who needs to stay on the ladder for an extended period of time and causes foot pain, in addition to reduced stability while working on ladder steps. There are not conventional ways of overcoming such drawbacks.

Accordingly, there is a need for an accessory to a ladder that allows for users to stand with greater stability and reduced pain to the feet of the user.

SUMMARY OF THE INVENTION

The present invention relates to an auxiliary platform for a ladder step. The auxiliary step platform may include a substantially rectangular and horizontally oriented platform with a platform front negative edge and a platform rear edge hem; a substantially flat front surface with a front surface flanged rearward-extending edge, and with the front surface flanged from the platform front negative edge. A bracing surface may be flanged from and extended downward from the platform rear edge hem and oriented substantially parallel to the front surface; and a biasing member may be removably connected to the bracing surface.

Embodiments of the invention to increase the utility of a ladder by placement of the platform on the ladder step and the biasing member is biased against the ladder step and the bracing surface to secure the auxiliary platform to the ladder step.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to an auxiliary step platform for a ladder.

Figure 1:
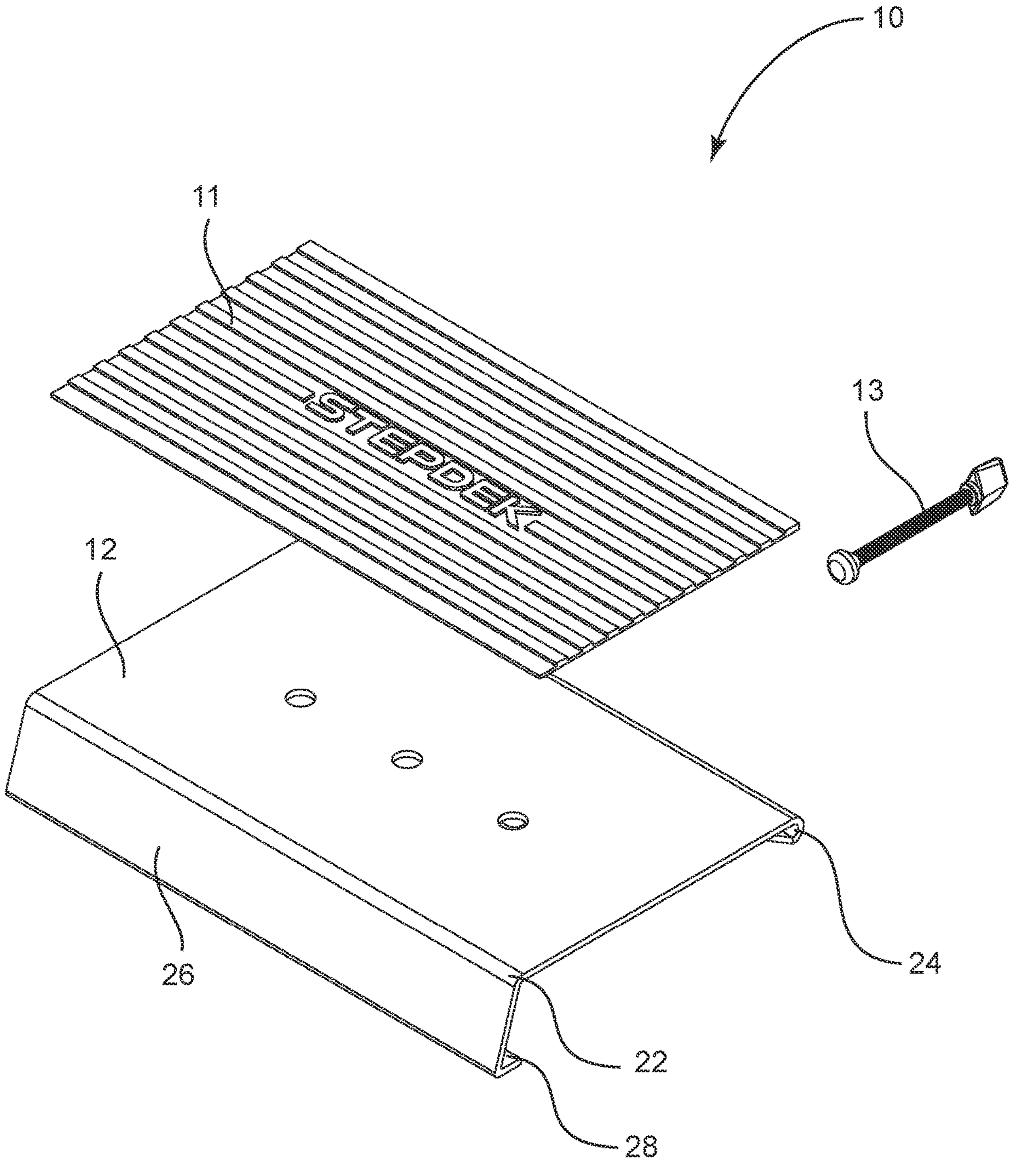
FIG. 1 illustrates a perspective top view of an auxiliary platform for a ladder step according to an embodiment.
Figure 2A:
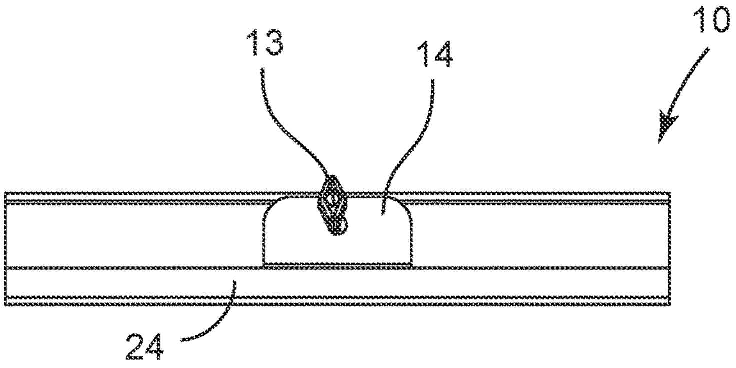
FIG. 2A is a rear view of an auxiliary platform for a ladder step according to an embodiment.
Figure 2B:
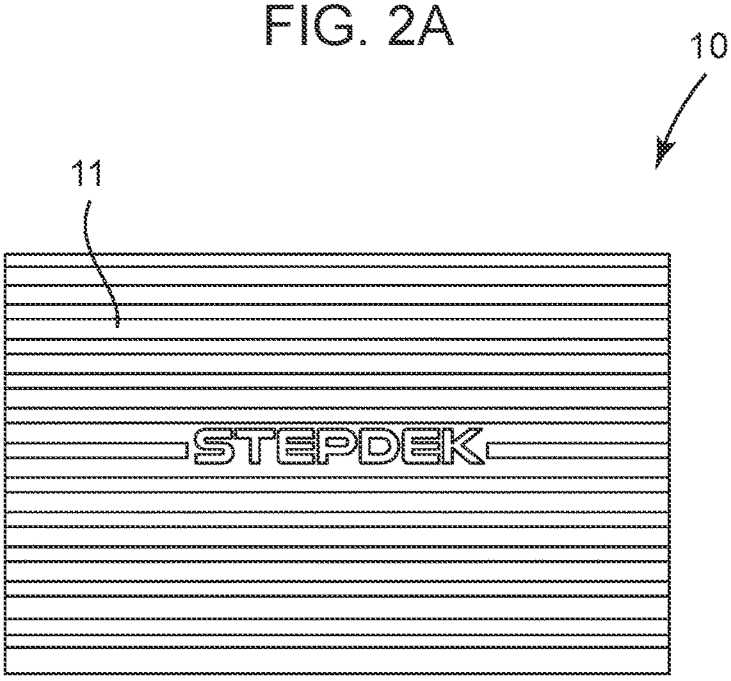
FIG. 2B is a top view of an auxiliary platform for a ladder step according to an embodiment.
Figure 2D:
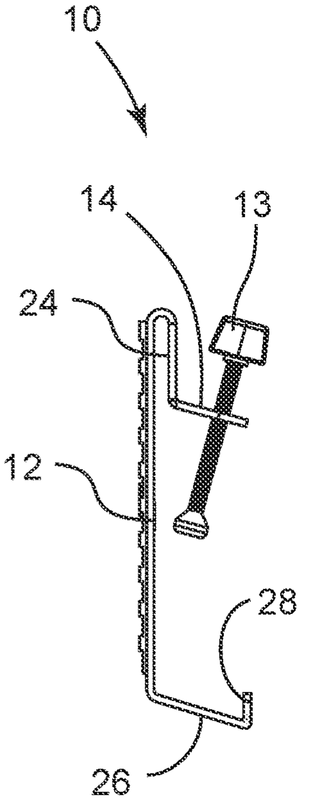
FIG. 2D is a side view of an auxiliary platform for a ladder step according to an embodiment.
Figure 2C:
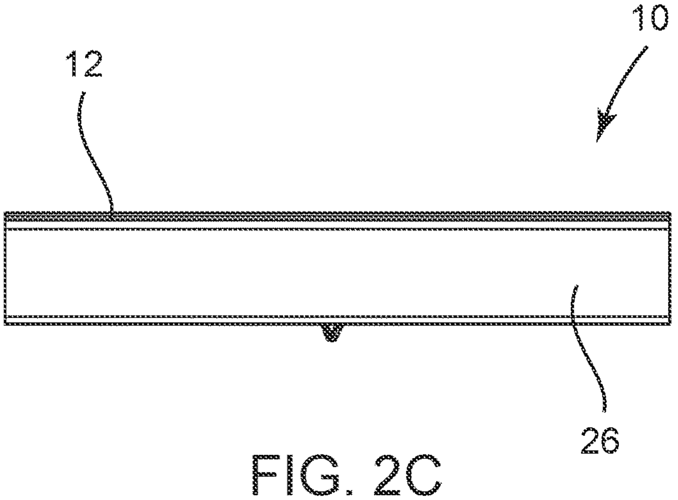
FIG. 2C is a front view of an auxiliary platform for a ladder step according to an embodiment.
Figure 2F:
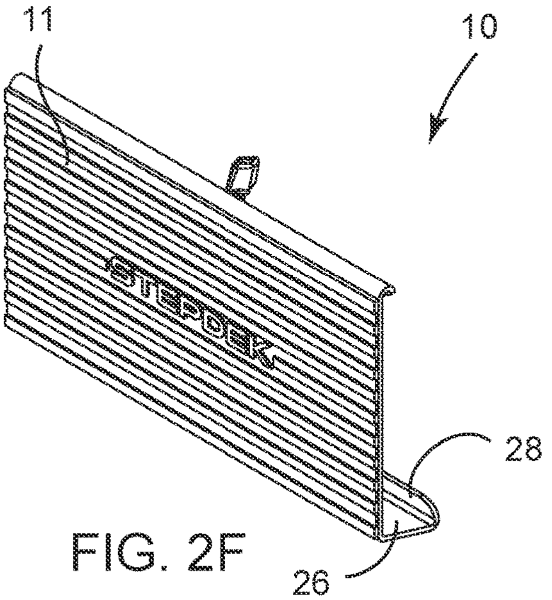
FIG. 2F is a top perspective view of an auxiliary platform for a ladder step according to an embodiment.
Figure 2E:
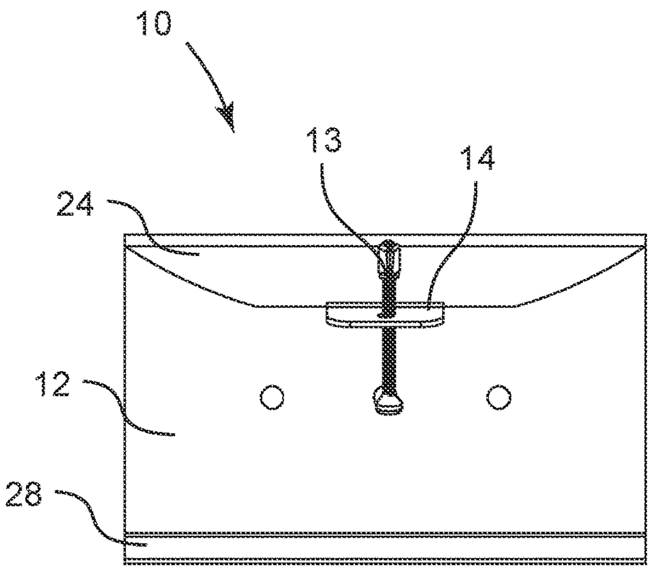
FIG. 2E is a bottom view of an auxiliary platform for a ladder step according to an embodiment.
Figure 2G:
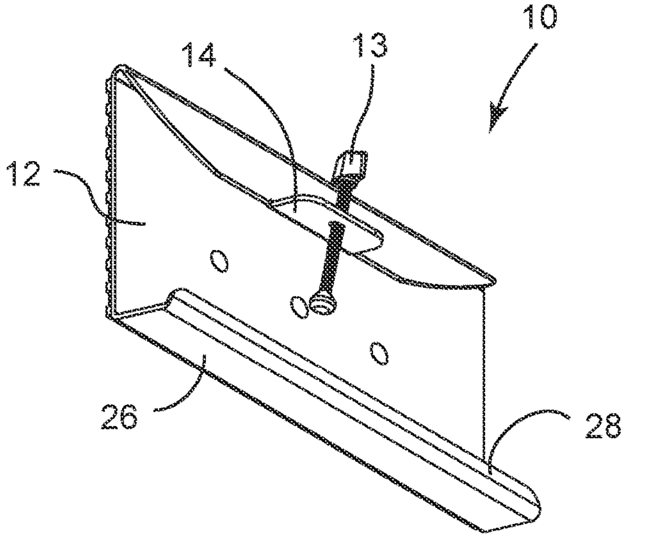
FIG. 2G is a bottom perspective view of an auxiliary platform for a ladder step according to an embodiment.
Figure 3A:
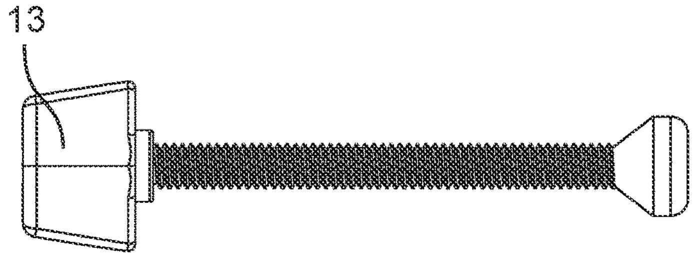
FIGS. 3A-3C illustrate several side views of a biasing member of an auxiliary platform for a ladder step according to an embodiment.
Figure 3B:
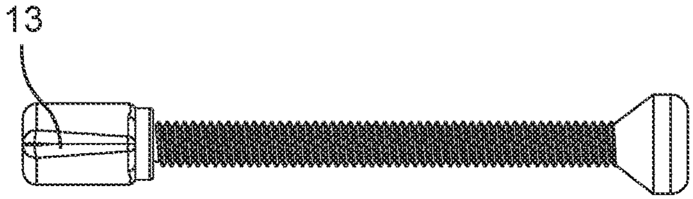
Figure 3C:
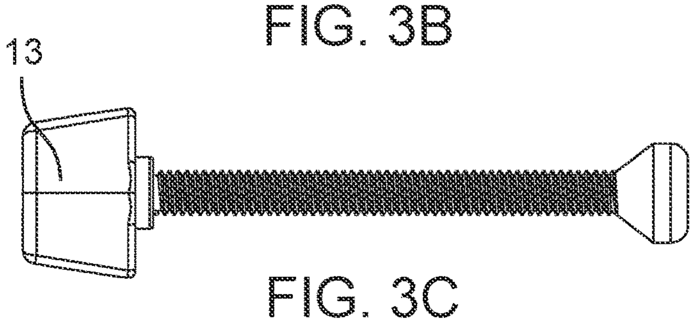
Figure 3D:
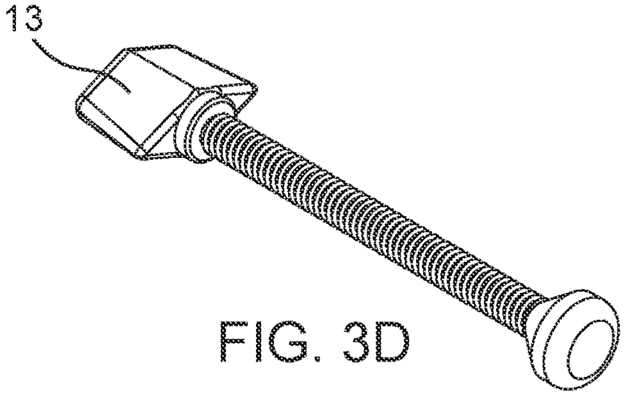
FIGS. 3D-3E illustrate perspective views of a biasing member of an auxiliary platform for a ladder step according to an embodiment.
Figure 3E:
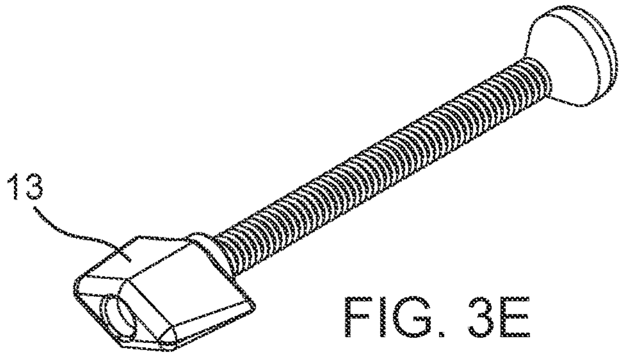
Figure 4:
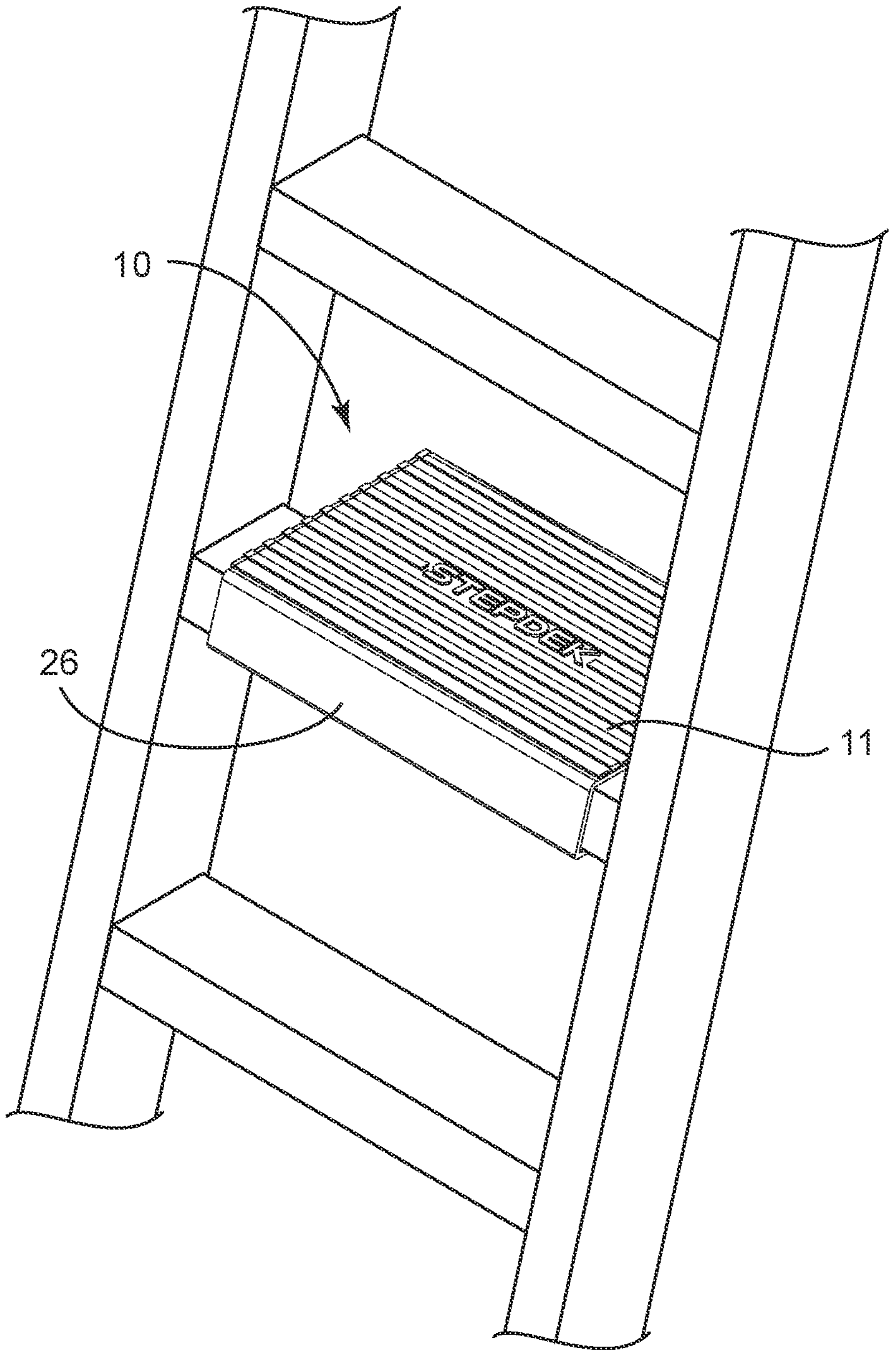
FIG. 4 illustrates an auxiliary platform for a ladder step coupled or secured to a ladder step according to an embodiment.
Figure 5A:
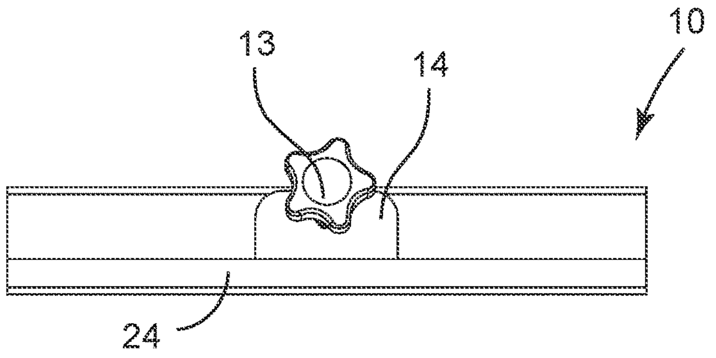
FIG. 5A is a rear view of another auxiliary platform for a ladder step according to an embodiment.
Figure 5B:
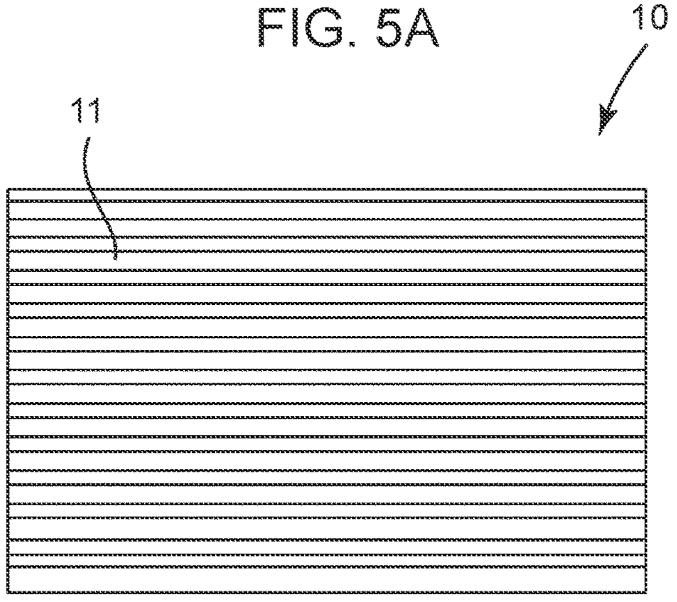
FIG. 5B is a top view of another auxiliary platform for a ladder step according to an embodiment.
Figure 5D:
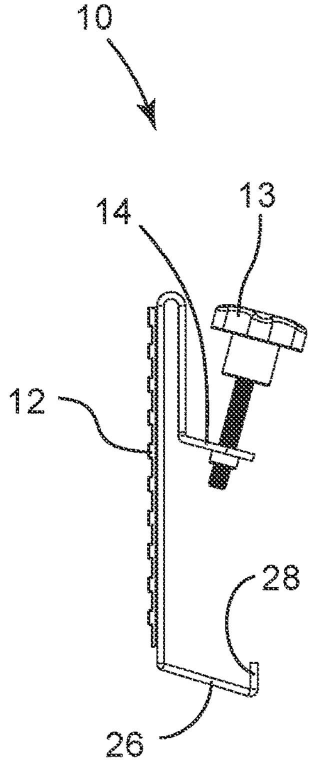
FIG. 5D is a side view of another auxiliary platform for a ladder step according to an embodiment.
Figure 5C:
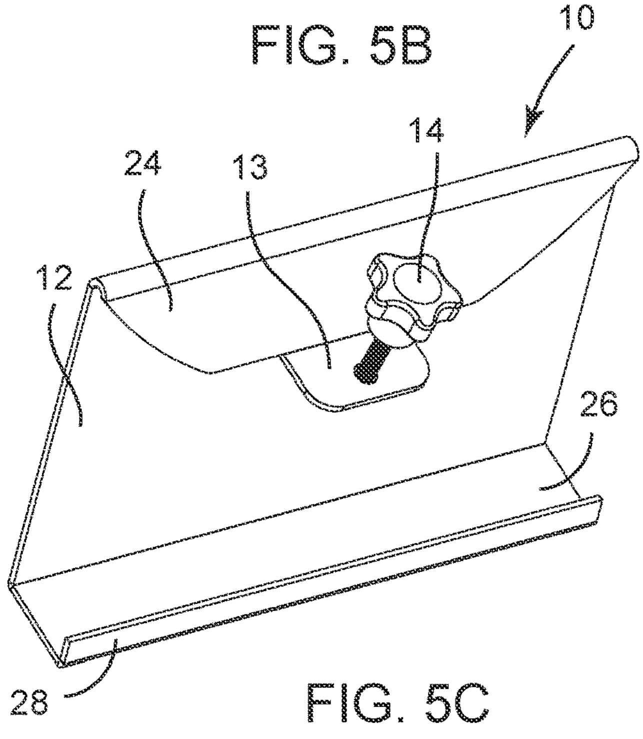
FIG. 5C is a bottom perspective view of another auxiliary platform for a ladder step according to an embodiment.
Figure 6:
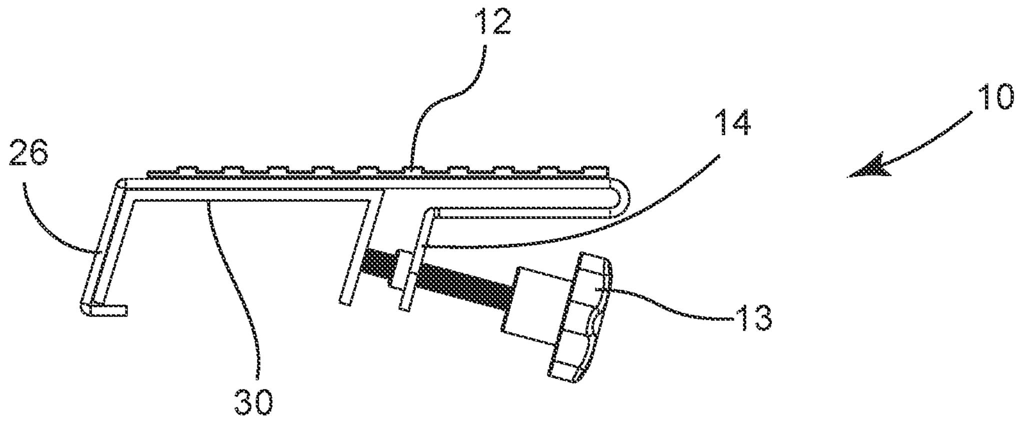
FIG. 6 is a side view of an auxiliary platform for a ladder step coupled to a ladder stop according to an embodiment.

As shown in FIGS. 1-5D, an embodiments include an auxiliary step platform 10 for a ladder. The auxiliary step platform 10 may include a substantially rectangular and horizontally oriented platform 12 with a platform front negative edge and a platform rear edge hem 24. The step platform 12 further includes a substantially flat front surface 26 flanged substantially downward from and along the platform front negative edge, the substantially flat front surface 26 further including a front surface rearward-extending flanged edge 28. The platform rear edge hem 24 extends parallel to the underside of the substantially rectangular and horizontally oriented platform 12 and a bracing surface 14 is flanged from and extended downward from the platform rear edge hem 24 and oriented substantially parallel to the front surface 26. Finally, a biasing member 13 removably connected to the bracing surface 14. In use, the platform 12 is placed on the ladder step 30 and the biasing member 13 secured against the ladder step 30 and the bracing surface 14 to secure the auxiliary platform to the ladder step 30, as shown in FIGS. 4 and 6. Moreover, as illustrated in the exploded view in FIG. 1, a similarly dimensioned non-slip member 11, such as a rubber pad, may be coupled to, or otherwise adhered to, the substantially rectangular and horizontally oriented platform 12 to deter slipping while stepping on the auxiliary step platform.

The front surface 26 extends substantially downward, or is flanged, from the platform front negative edge and sized and dimensioned to sit flush against the front surface of the ladder step. FIGS. 2A-2G and 5A-5D are views of the described embodiment wherein the back of the front surface 26 is substantially flat and sized and dimensioned to receive a ladder step 30 flush against said back of the front surface 26, as shown in FIG. 6. It is contemplated however that the substantially flat front surface 26 may be scaled to accommodate ladders having steps with shapes and dimensions other than those disclosed in the drawings or images. Also illustrated is the platform rear edge hem 24 that extends backward from the platform front negative edge 22 to position the bracing surface 14 at a position adjacent to the back surface of a ladder step. In an embodiment the biasing member 13 that is removably connected to the bracing surface 14 and a length of the platform rear edge hem 24 and position of the bracing surface 14 is at a distance from the back of the front surface 26 that is no greater than the additive width of the ladder step and the longest length of the biasing member 13, but preferably not greater than the width of the ladder step and about one-half the length of the biasing member 13. Of course, the dimensions of the platform rear edge hem 24 can be scaled to adapt the auxiliary step platform 10 to attached to alternately sized ladder steps. When coupled to the ladder step, the size of the platform is larger than the ladder step and allows for ease of standing and working for extended periods of time while standing on the auxiliary step platform 10.

Accordingly, the components defining any auxiliary step platform 10 may be formed of any of many different types of materials or combinations thereof that can readily be formed into shaped objects provided that the components selected are consistent with the intended operation of an auxiliary step platform 10. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any auxiliary step platform 10 may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive (e.g. ?), a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An auxiliary platform for a ladder step comprising:

a substantially rectangular and horizontally oriented platform with a platform front negative edge and a platform rear edge hem, wherein the platform rear edge hem extends horizontally parallel to the horizontally oriented platform;

a substantially flat front surface with a front surface flanged rearward-extending edge, the front surface flanged from the platform front negative edge, wherein the front surface is outwardly angled relative to the horizontally oriented platform and the front surface flanged rearward-extending edge extends substantially rearwardly parallel to the horizontally oriented platform;

a bracing surface flanged from and extended downward from the platform rear edge hem and oriented substantially parallel to the front surface, wherein the bracing surface is located between the platform front negative edge and the platform rear edge hem; and a biasing member removably connected to the bracing surface, wherein the biasing member extends through the bracing surface at an upwardly extending angle toward the horizontally oriented platform;

wherein the horizontally oriented platform is placed on the ladder step with a bottom surface of the horizontally oriented platform in contact with a top surface of the ladder step and a back surface of the front surface being flush against a front surface of the ladder step, and the bracing surface is at a distance from the back surface of the front surface that is no greater than the additive width of the ladder step and a longest length of the biasing member, the biasing member biased against the ladder step and the bracing surface to secure the auxiliary platform to the ladder step, and wherein the front surface flanged rearward-extending edge inhibits the auxiliary platform from accidental removal from the ladder step.

2. The auxiliary platform of claim 1, wherein the horizontally oriented platform is larger than the ladder step the auxiliary platform is coupled to.

3. The auxiliary platform of claim 1, further comprising a non-slip member coupled to a top surface of the horizontally oriented platform.

4. An auxiliary platform for a ladder step comprising:

a substantially rectangular and horizontally oriented platform with a platform front negative edge and a platform rear edge hem, wherein the platform rear edge hem extends horizontally parallel to the horizontally oriented platform, wherein the horizontally oriented platform is larger than the ladder step the auxiliary platform is coupled to;

a substantially flat front surface with a front surface flanged rearward-extending edge, the front surface flanged from the platform front negative edge, wherein the front surface is outwardly angled relative to the horizontally oriented platform and the front surface flanged rearward-extending edge extends substantially rearwardly parallel to the horizontally oriented platform;

a bracing surface flanged from and extended downward from the platform rear edge hem and oriented substantially parallel to the front surface, wherein the bracing surface is located between the platform front negative edge and the platform rear edge hem;

a biasing member removably connected to the bracing surface, wherein the biasing member extends through the bracing surface at an upwardly extending angle toward the horizontally oriented platform; and a non-slip member coupled to a top surface of the horizontally oriented platform;

wherein the horizontally oriented platform is placed on the ladder step with a bottom surface of the horizontally oriented platform in contact with a top surface of the ladder step and a back surface of the front surface being flush against a front surface of the ladder step, and the bracing surface is at a distance from the back surface of the front surface that is no greater than the additive width of the ladder step and a longest length of the biasing member, the biasing member biased against the ladder step and the bracing surface to secure the auxiliary platform to the ladder step, and wherein the front surface flanged rearward-extending edge inhibits the auxiliary platform from accidental removal from the ladder step.

* * * * *